Figure 8:
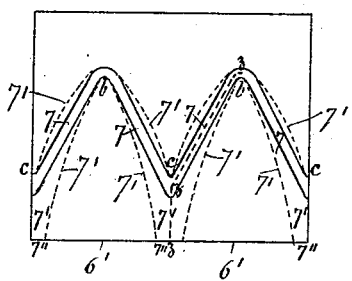

(No Model.) 3 Sheets—Sheet 1.
J. H. BOWDEN.
BEARING FOR CAR WHEELS.
No. 419,494. Patented Jan. 14, 1890.
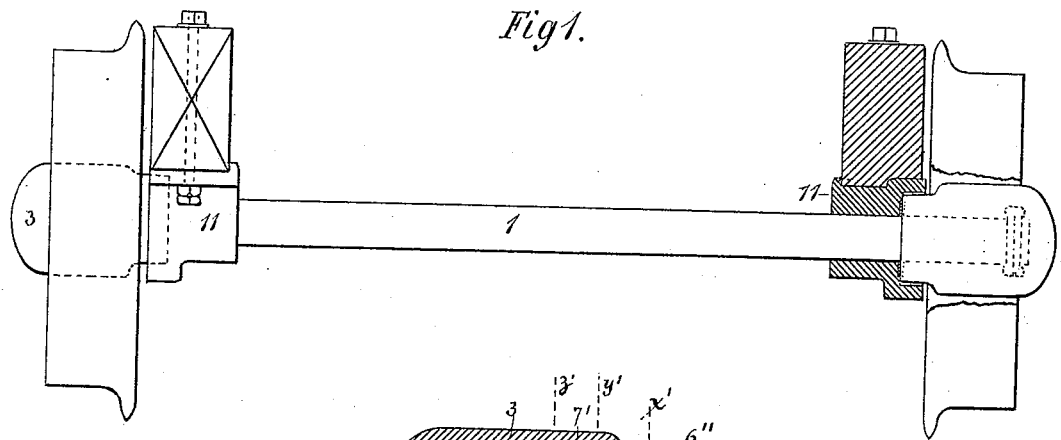
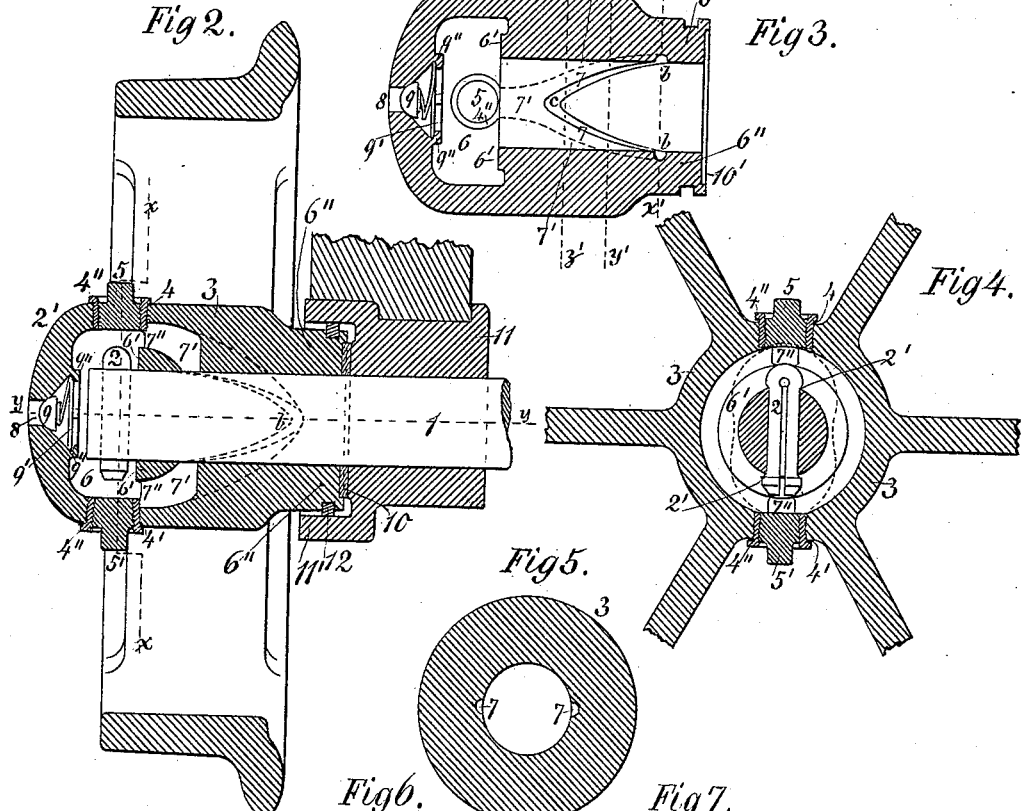
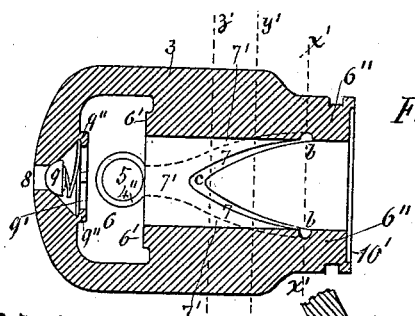
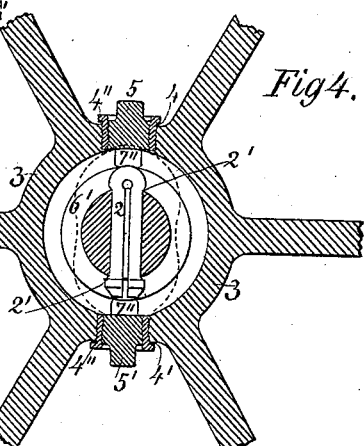
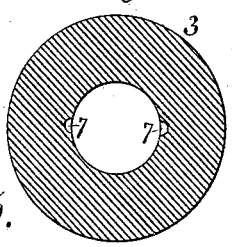
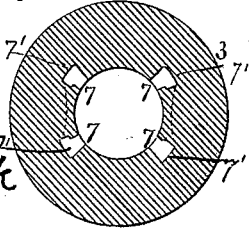
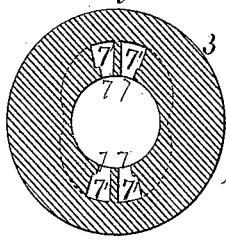
Witnesses:
J. T. Theo Lang.
Edward J. Fenwick
Inventor:
James H. Bowden
by his attys
Mason, Fenwick & Lawrence (No Model.) 3 Sheets—Sheet 2.

J. H. BOWDEN.
BEARING FOR CAR WHEELS.

No. 419,494. Patented Jan. 14, 1890.

Witnesses:
J. P. Theo. Lang
Edward T. Fenwick

Inventor:
James H. Bowden
by his attys
Mason, Fenwick and Lawrence (No Model.) 3 Sheets—Sheet 3.
J. H. BOWDEN.
BEARING FOR CAR WHEELS.

No. 419,494. Patented Jan. 14, 1890.

Witnesses:
J. P. Theo. Lang.
Edward T. Fenwick

Inventor:
James H. Bowden
by his attys
Mason, Fenwick and Lawrence

UNITED STATES PATENT OFFICE.

JAMES H. BOWDEN, OF WILKES-BARRÉ, PENNSYLVANIA.

BEARING FOR CAR-WHEELS.

SPECIFICATION forming part of Letters Patent No. 419,494, dated January 14, 1890.

Application filed October 29, 1889. Serial No. 328,569. (No model.)

*To all whom it may concern:*

Be it known that I, JAMES H. BOWDEN, a citizen of the United States, residing at Wilkes-Barré, in the county of Luzerne and State of Pennsylvania, have invented certain new and useful Improvements in Axle and Shaft Bearings for Car-Wheels and for other Purposes; and I do hereby declare the following to be a full, clear, and exact description of the invention, such as will enable others skilled in the art to which it appertains to make and use the same.

My invention relates, generally, to means for lubricating the bearings of car axles and shafts, and particularly to the hubs of car-wheels, which are mounted upon fixed axles, so that they can rotate independently of the axle; and it consists, first, in a novel construction and arrangement of an axle or shaft bearing provided with a continuous zigzag channel or channels formed of branches of less length than the bearing, said channel or channels having oil-supply divergent or oblique passages, which are preferably curved, and along their backs extend from the oil-chamber to the farther apexes of the channel or channels, being in communication therewith continuously, and at points radially beyond the bore of the bearing communicating with the oil-chamber of said bearing, and therefrom conduct the oil into the zigzag channel or channels. The branches of the said channel or channels are spiral and tapered circumferentially and radially toward the inner edge of the bearing and are in communication with each other and the bore of the bearing, while the passages, although in communication at their farther apexes with the channel or channels, only enter the bearing near the inner surface of the oil-chamber. By this part of my invention I effect an automatic distribution of the oil from the oil-chamber upon the surface of the axle all around and along it a suitable distance between the ends of the bearing and keep the oil in constant circulation, the oil passing back and forth along the spiral branches of the continuous channel in a current commensurate with the velocity with which the wheel is rotating and the requirements of the work being done, and such portion of supply-oil as is not received by the channel or channels from one of the passages is returned to the oil-chamber by the other passage; or, in other words, one or the other of the supply-passages, by reason of centrifugal force, carries the oil along its back from the oil-chamber down to the axle at the farther apexes of the zigzag channel or channels, and from those points the oil is carried in the zigzag channel or channels along the axle, back and forward from the farther to the nearer apexes thereof, the highest portion of the channel or channels being open to the passages, and the oil not taken by the zigzag channel or channels being returned to the oil-chamber by the passage which is in position for returning the surplus oil to said chamber. There are two currents, one in and the other out of the passages from the oil-chamber to the farther apexes, and the other current in the zigzag channel along the axle from the farther to the nearer and from the nearer to the farther apexes, and so on continuously. The zigzag channel or channels and passages are so constructed that a continuous body of bearing-metal all around the bore of the bearing is left at both ends for the support of the axle and at one end for contact of the exposed portions of the cotter-pin, the said metal extending from the beginning of the channel to that end of the bearing nearest the oil-chamber.

It consists, second, in the combination, with an axle having a linchpin-hole near its end and a linchpin inserted in said hole, of a wheel-hub comprising an oil-chamber having oil-supply and linchpin hole, a zigzag lubrication-channel, and corresponding passage in communication radially with the bore of the hub along the whole length of the channel and also with said oil-chamber, an axle-box having a dust-guard, a washer fitting the axle closely and entered loosely in a recess in the end of the hub, and a packing-ring on the outside of the inner end of the hub and fitting the inside of the dust-guard, as will be hereinafter described and claimed.

It consists, third, in a car-wheel having a hub cast with a closed outer end and provided with an oil-supply-passage in the said closed end, in combination with a spring-stopper seated on the inside of said closed end, said stopper being inserted into the hub through its inner open end.

Fourth, in a wheel having a hub cast with a closed outer end, in combination with certain means, as will be hereinafter described, applied at its open end, whereby leakage and waste of oil and the entrance of dust and sand are prevented, and, fifth, in certain other novel constructions, combinations, and arrangements of parts, as will be hereinafter described and claimed.

Figure 9:
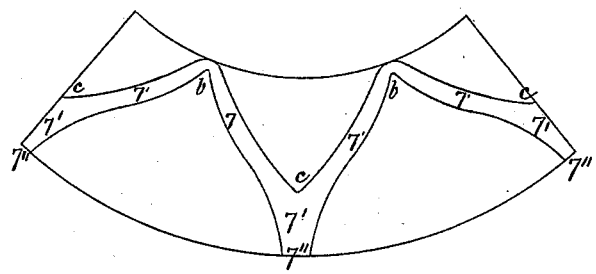
Figure 10:
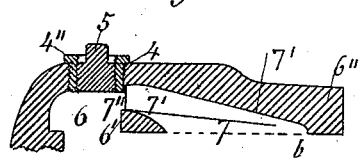
Figures 11, 12:
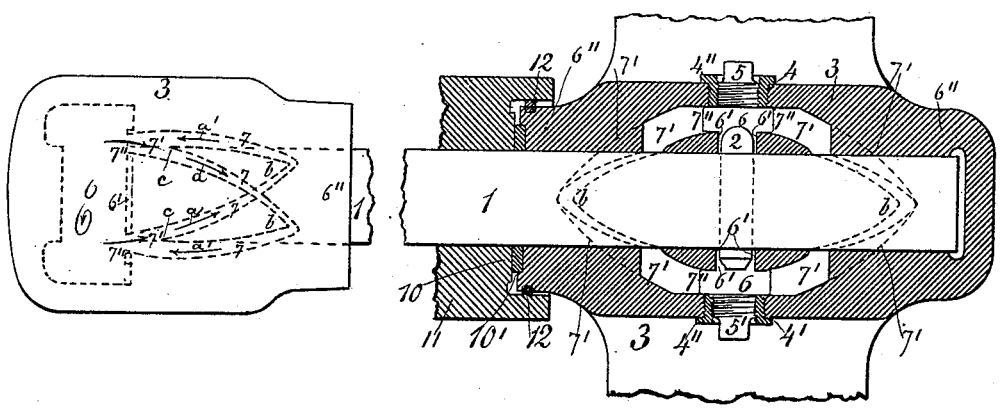
Figure 13:
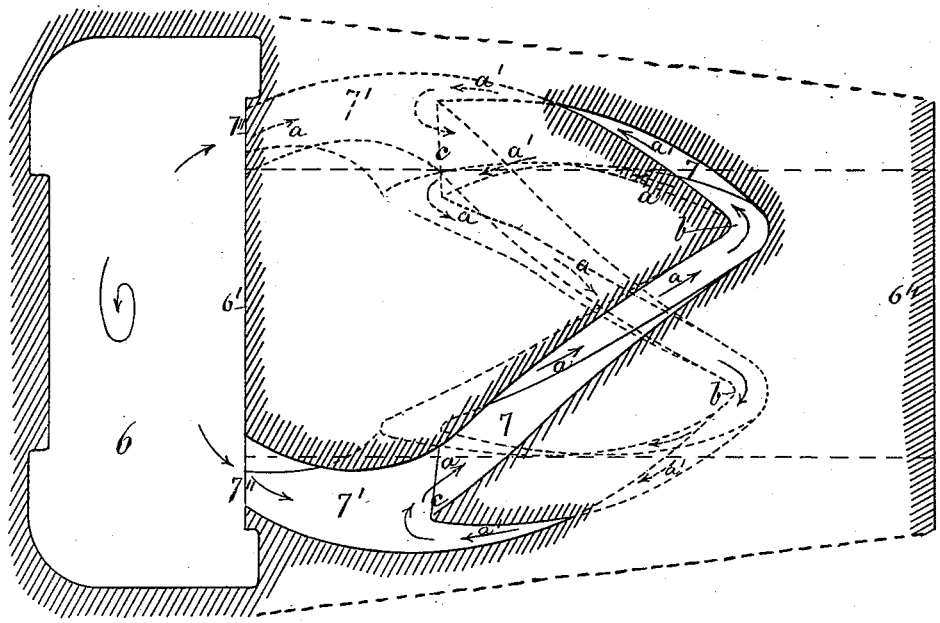

In the accompanying drawings, Figure 1 is an elevation of a car-axle mounted and provided with wheels, one of the bolsters and axle-boxes being shown in section, and one of the wheels having a portion broken away in order to expose the improved hub or bearing. Fig. 2 is a vertical central longitudinal section of a wheel, its hub or bearing, and axle-box, and an elevation of one of the end portions of the axle. Fig. 3 is a horizontal central longitudinal section of the hub or bearing in the line $y$ $y$ of Fig. 2. Fig. 4 is a transverse section in the line $x$ $x$ of Fig. 2. Fig. 5 is a transverse section in the line $x'$ $x'$ of Fig. 3. Fig. 6 is a transverse section in the line $y'$ $y'$ of Fig. 3. Fig. 7 is a transverse section in the line $z'$ $z'$ of Fig. 3. Fig. 8 is an evolution of the inner bearing-surface of the hub or bearing, exposing the oil-chamber and indicating the ports or oil-induction openings, passage, and channel. Fig. 9 is an evolution of the imaginary conic surface in which the back surfaces of the said ports or openings, passage, and channel are situated. Fig. 10 is a section in the line $z$ $z$ $z$ of Fig. 8. Fig. 11 shows a portion of the axle in the hub or bearing, the latter being shown in outline, and the oil-chamber and said ports or openings, passage, and channel being shown in dotted lines. Fig. 12 is a central longitudinal section of one part of my invention applied on a different style of axle-bearing. Fig. 13 is a view of the bearing or hub, illustrating the oil-chamber in section and the ports or openings, passage, and channel as they appear from the outside of the hub or bearing, the outside metal being removed as far as the nearest surfaces of one of the ports or openings and a portion of the passage, and the ports or openings, the passage, and the channel being shown partly in full and partly by dotted lines.

In the drawings, 1 indicates the axle; 2, linchpin or cotter-key; 2', pin-hole in axle; 3, hub of wheel; 4 4', holes leading into and out of oil-chamber of a hub; 4'', gas-pipe reducers for holes 4 4'; 5 5', plugs to close the holes 4 4'; 6, oil-chamber; 7, zigzag channel; 7', induction-openings, and 7'' zigzag connection oil-supply and circulation passage from the oil-chamber to the zigzag channel 7; 8, oil-hole in the end of the hub; 9, spring-stopper for the oil-hole 8; 10, washer on axle between the hub and axle-box; 11, axle-box for attaching axle to car; 12, packing-ring of axle-box dust-guard, filling the space between the hub and axle-box dust-guard 11'.

In practice with my invention the wheels are mounted loosely upon the plain cylindrical smooth rolled or turned axle 1, with the pin-hole 2' drilled in each end to receive the linch or cotter pin 2, said pin being, preferably, a split spring-key with a notch on the side of its head into which a wire hook can be inserted for its removal; but in lieu of this cotter-pin a common linchpin may be used, and to this end the hole 4', coinciding with the hole 4, is provided in the hub, in order that such linchpin may be readily removed with an ordinary "drift." The hub 3 is bored out to fit loosely on the axle and is faced at its inner open end. The holes 4 4', leading into the oil-chamber 6, are preferably constructed cylindrical by casting gas-pipe reducers 4'' in this part of the hub, and are provided with suitable threaded taper plugs 5 5', whereby they can be opened and closed. These plugs are preferably flat-bottomed and terminate flush with the inner surface of the oil-chamber in order to avoid any liability of the pins 2 catching against them if from any cause they (the pins) should become loose or broken.

Between the ends of the bearing portion of the hub 3, which portion forms the bearing-surface for the axle, a continuous zigzag spiral channel 7 is formed, the same extending into the bore of the bearing, along a portion of its length, and entirely around the same, as illustrated in the drawings. This channel should extend a sufficient distance between the ends of the said bearing to insure perfect lubrication, and at the same time leave strong continuous bearing bodies of metal 6' 6'' at the inner and outer ends of the bearing. This channel should communicate radially with a corresponding zigzag passage 7', and thereby become deepened radially and widened circumferentially. The passage 7' should be gradually decreased in depth radially and in width circumferentially as its branches approach and unite at the apexes $b$, formed by the junction of the branches of the channel, which junctions are farthest from the oil-chamber 6, as shown in the drawings, and at the points of or about its greatest depth it should unite with the divergent or oblique oil-induction openings or portways formed in the hub or bearing, so as to communicate with the oil-chamber by said ports radially beyond and outside the bore of the bearing and at or near the inner surface of said oil-chamber.

The openings or ports 7'', passage 7,' and channel 7 are so formed in the body of metal of which the bearing or hub is formed that a solid annular body of metal 6' is left at the end of the axle-bearing nearest the inclosed end of the hub, and thus from the apexes $c$ of the passage 7' and the channel 7 to the mouth of the ports or openings 7'' these ports or openings have no communication with the bore of the bearing, and consequently a continuous body of bearing metal 6' for the axle and cotter-pin is provided.

Radially beyond the ports or openings 7'', or where these ports 7'' and the passage 7' enter the oil-chamber, their radial distances from the center of the axle are preferably greater than the diameter of the oil-chamber, in order to afford greater room for oil-circulation and facilitate its supply to the channel 7. The manner in which the passages 7' are gradually decreased in width from the apexes c to the apexes b is clearly illustrated in plan by Fig. 9 and in cross-section by Figs. 5, 6, and 7.

The wheel, as described and represented, is made in a single casting, the bore, oil-chamber, zigzag channel, passage, and induction-openings being cast upon a single core from which the core-rods, sand, &c., are easily and perfectly removed through the open end of the hub, there being no inaccessible shoulders or holes for the lodgment of sand or grit. In the drawings the zigzag channel is represented as formed with four branches; but the number of these and their angle to the axis of rotation may be varied for hubs of different-sized bores, and one or as many more as desirable of the apexes of these branches forming the zigzag channel may be connected with ports or openings 7'' and passage 7', which are radially deeper in the hub or of greater radial distance from the center of the axle to lead the oil in sufficient quantity from the oil-chamber to the said zigzag channel. Should it be desirable to have a longer hub, the oil-chamber with linchpin working in it may be placed in the center of the hub with duplicate similar zigzag channels 7, passages 7', and openings 7'' from it in opposite directions, as illustrated in Fig. 12. The same construction of lubrication channels, passages, and openings can be used on a continuous shaft with collars at the ends of the shaft-bearing without departing from this part of my invention.

In Figs. 2 and 3 is shown a method of providing an additional oil-hole 8, so that if desirable the wheel may be oiled while in motion without removing either of the plugs 5 5', said oil-hole being formed in the central part of the closed end of the hub and provided with a countersunk seat into which the hemispherical stopper 9 is fitted and retained in position by a flat spiral spring 9', held in place by suitable lugs 9''. By this arrangement when the stopper is pressed back it enters between the coils of the spring, thus avoiding the waste of space incurred by the use of a helical spring, in which the coils must rest on one another. The hemispherical shape of the stopper in connection with the conical entrance to the oil-hole insures its return to its position accurately.

The spring-stopper is capable of being placed in position against the closed end of a long hub by inserting it in a cylindrical tin tube fitting inside the lugs 9'' and pushing it to its place through the tube by a cylindrical piece of wood loosely fitting said tube and then withdrawing the tube. This stopper, although not generally used, affords additional convenience for oiling when the plugs 5 5' are not standing vertically or when the wheel is in motion.

A washer 10, snugly fitting the axle, is preferably used between the wheel and axle-box 11 for the purpose of excluding dust, reducing the friction, and preventing leakage of oil along the axle. This washer fits loosely a seat-recess 10' in the end of the hub, as shown.

A packing-ring 12 fills the space between the wheel-hub and the dust-guard 11' of the axle-box, so as to prevent the admission of dust or any escape of oil. Should the axle or axle-box have a collar, the packing-ring may be placed on it, and the hub of the wheel recessed so that the dust-guard may extend over the collar and pack the joint in a manner similar to that shown.

From the aforegoing specification it will be seen that the axle is secured to the car by the boxes 11, the washer and wheel placed on each projecting end or "overneck" of the axle, the packing-ring 12 adjusted to its place in the box, the hole 2' in the axle brought opposite the holes 4 4' in the oil-chamber of the hub, the pin inserted into the hole 2' of the axle, the wheel held in lateral position by the axle abutting against the closed end of the oil-chamber and the cotter or linch pin against the solid body of bearing-metal 6', one or the other of the screw-plugs removed, and a proper quantity of lubricant introduced into the oil-chamber through the unplugged hole and the plug then replaced and screwed tight, so as to seal the oil within the wheel, and that the oil in the chamber 6 will, on the wheel being rotated either forward or backward by the motion of the car, be caused by centrifugal force to gradually leave said oil-chamber through the openings 7'', enter the zigzag passage 7', and thence the branches of the zigzag channel 7, as indicated by arrows a a, and as the oil passes to the farther apexes b of the channel it enters the return branches of the same, in which it runs toward the oil-chamber, as indicated by the arrows a' a', until it reaches the nearer apexes c, around which it passes, and in turn enters the adjoining zigzag branches of the said channel in the direction of the arrows a a, and so on continuously. The oil approaches closer to the axle as it passes to the farthest apexes b, where the cone of the back of the passage 7' coincides with the plane of the zigzag channel 7, and there is not room at this point for the oil to pass without touching the axle. Thence the oil is carried back and forth in a continuous current along the axle in the zigzag channel 7, a constant circulation from and back to the oil-chamber being kept up along the bottoms or back parts of the zigzag passage and in the channel, and fresh oil being constantly supplied to the zigzag channel and to the axle at the farther apexes *b* to replace the wear and leakage back into the oil-chamber along the axle, thus doing away with the objection to leading the oil down through the radial slits or openings, which is a great improvement on previous constructions, as hereinafter shown.

It is to be understood that my invention of an axle-bearing with ports, zigzag passage or passages, and channel or channels is not necessarily confined to a wheel-hub having two coinciding plugged oil-supply and cotter or linch pin insertion holes, as it would remain the same if but one such hole were provided, or if other modes of supplying the oil thereto were adopted; again, that it is not necessarily confined to a bearing-hub cast with one end closed, as it would remain the same and perform a like office if the axle or shaft extended through both ends of a hub, and such hub were provided with either an end oil-chamber or a central oil-chamber, and, finally, that it is not necessarily confined to a hub-bearing having a spring oil-stopper, a dust-guard, and a leak-preventing washer.

The advantages of the invention herein described as applied to a car-wheel are: the positive and continuous supply of oil and slight liability of the oil channel or channels and passage or passages becoming clogged by the accumulation of detritus or gummy oil, which channel and passage, being large and open to the ports and oil-chamber, will be cleared by the circulatory action of the main current; the ease with which the oil-channel can be cleaned should it become choked by the detritus and gummy oil after long use; the simple and economical construction of the wheel-hub and the simple manner of securing the same to a plain and inexpensive axle, and the complete exclusion of dust and prevention of waste of oil, which latter advantage results from the employment of a hub closed at one end without other openings in it than those requisite for the introduction of the supply-oil and the drifting of the linchpins, and which openings are tightly closed by screw-plugs.

In the best automatic lubricators for distributing the oil over and along the axle-bearing by the rotation of loose wheels having closed hubs heretofore used the device consists of oil chambers and channels arranged in and around the hubs in an annular, oblique, or spiral manner, so as to carry the oil from the main reservoir through passages in the hub outside the bearing laterally in a continuous current by the centrifugal force from the rotation of the wheel, and to connect these passages with the inside grooves in the bearing-surfaces with small radial slits or openings leading to the axle. This device is inefficient and faulty, because the direction of the current is not toward the center of rotation and is opposed from going in that direction by the centrifugal force of rotation, which becomes greater as the speed of rotation and consequent friction increases. Therefore the oiling is imperfect through these openings upon the axle or shaft, and they soon become clogged and shut up by detritus or the wear of metals and impurities in the oils used.

What I claim is—

1. An axle or shaft bearing having a zigzag channel and a corresponding zigzag passage, both extending spirally around and leading radially into the bore of the bearing along the whole length of the channel and communicating outside of its bore with an oil-supply, substantially as described.

2. An axle or shaft bearing having a zigzag channel extending spirally around and leading radially into its bore and communicating with a circulatory zigzag passage having induction ports or openings, substantially as described.

3. An axle or shaft bearing having a zigzag channel extended spirally around and leading radially into its bore and increased radially in depth and circumferentially in width outside its bore, substantially as described.

4. A shaft or axle bearing having ports or oil-induction openings isolated from its bore at the near end of the bearing and united with said bore some distance from said end of the bearing by means of a zigzag passage and channel leading into the bore, substantially as described.

5. An axle or shaft bearing having a continuous spiral zigzag channel around, a proper distance along, and in communication with its bore, said channel being in connection with a zigzag passage which tapers radially toward the points or farther apexes *b* of the branches of the channel and connected with induction-ports or oil-supply openings, substantially as described.

6. An axle or shaft bearing having a continuous spiral zigzag channel around, a proper distance along, and in communication with its bore, said channel being in connection with a passage which tapers circumferentially toward the points or apexes of the branches of the channel and connected with induction-ports or oil-supply openings, substantially as described.

7. An axle or shaft bearing having a continuous spiral zigzag channel around, a proper distance along, and in communication with its bore, said channel being in connection with a passage which is tapered circumferentially and radially toward the points or apexes *b* of the branches of the channel and are connected with induction-ports or oil-supply openings, substantially as described.

8. An axle or shaft bearing having an oil-chamber, zigzag channel, zigzag passage, and divergent or oblique induction-ports or supply-openings, said channel, passage, and ports or openings being in communication with one another and with the oil-chamber and the bore of the bearing, and each of the branches of said channel and passage running spirally partly around the bore, and the several branches unitedly circulating and supplying oil from the oil-chamber a suitable distance along and all around the axle and also back into the oil-chamber, substantially as described.

9. An axle or shaft bearing having an oil-chamber intermediate its ends, a zigzag oil-channel, a zigzag connecting-passage, and oblique or divergent oil-supply ports or openings at each end of said oil-chamber, said channels, passages, and ports or openings at either end of the oil-chamber being in communication with one another and with the oil-chamber and the bore of the bearing, and each of the branches of said channels and passages running spirally partly around the bore of the bearing, and the several branches unitedly encircling the axle or shaft at either end of the oil-chamber and supplying oil suitable distances along and all around the axle or shaft which is placed in the bearing, substantially as described.

10. In a bearing for an axle or a shaft having one or more zigzag channels extending through its bore entirely around and a suitable distance along the same between the ends of the bearing, and one or more passages connected with said channel at one or more of the apexes or points of juncture of the branches of said zigzag channel or channels, and one or more sets of right and left hand oil-supply ports or openings extended through the inner end of the bearing at points outside its bore and at an angle or inclination to the axis of rotation and to the cylindrical surface of the bore of the bearing, the branches of the passage or passages having but small depth at the junctures or apexes $b$ of the branches of the channel or channels, and the ports or openings terminating at or about the inner surface of the oil-chamber, leaving a continuous body of metal as a bearing for the shaft or axle beyond the points of juncture $c$ of the channel or channels and said passage or passages and ports or openings, substantially as described.

11. The combination, with an axle having a linchpin-hole near its end and a linchpin inserted in said hole, of a wheel-hub comprising an oil-chamber having oil-supply and linchpin hole, a zigzag lubrication-channel and corresponding passage in communication radially with the bore of the hub along the whole length of the channel and also with said oil-chamber, an axle-box having a dust-guard, a washer fitting the axle closely and entered loosely in a recess in the end of the hub, and a packing-ring on the outside of the inner end of the hub and fitting the inside of the dust-guard, substantially as described.

12. The combination, with the bearing cast with one of its ends closed and with an oil-hole in its said closed end, of a spring oil-stopper seated opposite said opening on the inside of the oil-chamber of the bearing, substantially as described.

13. The combination, with the wheel-hub provided with an oil-chamber and a zigzag lubrication-channel, in communication with the bore of the bearing and said oil-chamber, of an axle, an axle-box having a dust-guard, a washer fitting the axle closely and entered loosely in a recess in the end of the hub, and a packing-ring on the outside of the hub fitting the inside of the dust-guard, substantially as described.

In testimony whereof I hereunto affix my signature in presence of two witnesses.

JAMES H. BOWDEN.

Witnesses:
R. VAN A. NORRIS,
H. H. STOEK.